United States Patent [19]

Dorr

[11] Patent Number: 4,530,067
[45] Date of Patent: Jul. 16, 1985

[54] RESTAURANT MANAGEMENT INFORMATION AND CONTROL METHOD AND APPARATUS

[75] Inventor: John A. Dorr, Crofton, Md.
[73] Assignee: Xecutek Corporation, Crofton, Md.
[21] Appl. No.: 392,426
[22] Filed: Jun. 25, 1982

Related U.S. Application Data

[63] Continuation of Ser. No. 242,244, Mar. 10, 1981, abandoned, which is a continuation of Ser. No. 70,522, Aug. 28, 1979, abandoned, which is a continuation of Ser. No. 705,932, Jul. 16, 1976.

[51] Int. Cl.³ .............................................. G06F 15/21
[52] U.S. Cl. ..................................... 364/900; 364/401
[58] Field of Search ... 364/200 MS File, 900 MS File, 364/401, 405, 464

[56] References Cited

U.S. PATENT DOCUMENTS

| | | | |
|---|---|---|---|
| 3,267,436 | 8/1966 | Alpert et al. | 364/900 |
| 3,605,089 | 9/1971 | Gray | 364/900 |
| 3,688,276 | 8/1972 | Quinn | 364/200 |
| 3,792,444 | 2/1974 | Spinner | 364/900 |
| 3,899,775 | 8/1975 | Larsen | 364/900 |
| 3,956,740 | 5/1976 | Jones et al. | 364/900 |
| 4,007,443 | 2/1977 | Bromberg et al. | 364/200 |
| 4,025,766 | 5/1977 | Ng et al. | 364/900 |
| 4,090,247 | 5/1978 | Martin | 364/900 |
| 4,107,784 | 8/1978 | Van Bemmelen | 364/900 |

Primary Examiner—Thomas M. Heckler
Attorney, Agent, or Firm—Jim Zegeer

[57] ABSTRACT

A method and the apparatus for management information and control for restaurants is disclosed. The apparatus includes a plurality of remote units carried by waiters. The remote units are provided with a keyboard, a display and a memory. The remote units may simply be radio frequency transmitters capable of being interrogated, but are preferably radio transmitters and receivers. A central interrogator transceiver periodically interrogates each of the remote units after which the remote units transmit information back to the central interrogator transceiver. The central interrogator transceiver couples the information transmitted thereto to a central processor having a high speed memory therein. The central processor operates on the information received to provide order information to a kitchen display, an order assembly display, a service bar display, a table status display and to a check printer-cash register unit. The order information is also coupled to an inventory control unit for decrementing the various items in inventory by the quantity of items ordered by each customer. A number of computations are made such as the number of particular items ordered, the rate of turnover of customers, quantity of items in inventory, etc. which information is retrievable to give the restaurant management information with regard to the operational characteristics, for example, food flow of the restaurant.

5 Claims, 2 Drawing Figures

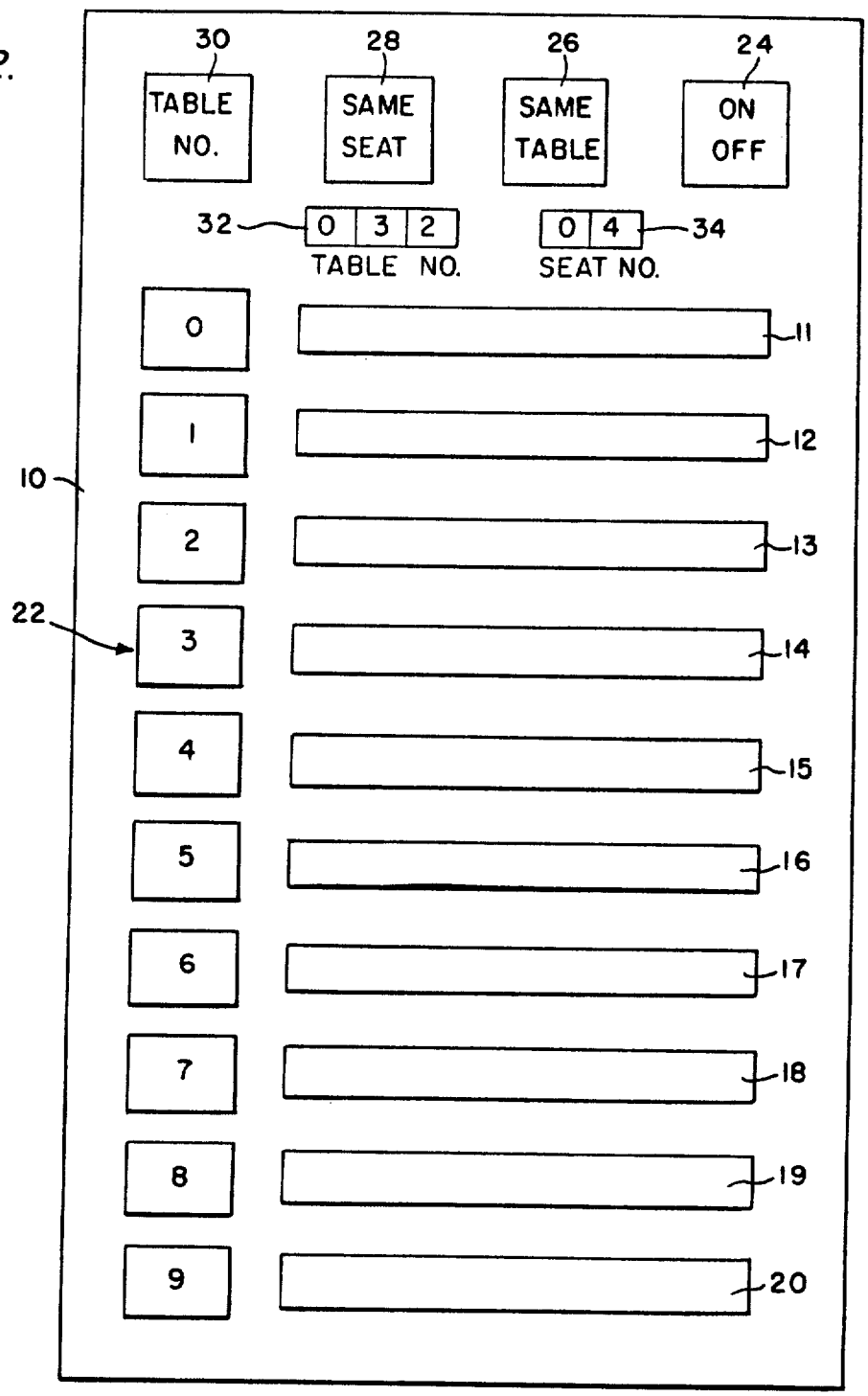

RESTAURANT MANAGEMENT INFORMATION AND CONTROL METHOD AND APPARATUS

This is a continuation of application Ser. No. 242,244, filed Mar. 10, 1981 "RESTAURANT MANAGEMENT INFORMATION AND CONTROL METHOD AND APPARATUS", now abandoned, which is a continuation of Ser. No. 070,522, filed Aug. 28, 1979, now abandoned, which is a continuation of Ser. No. 705,932, filed July 16, 1976.

BACKGROUND OF THE INVENTION

This invention relates to a method and apparatus for managing and controlling information, and more particularly to a method and apparatus for managing and controlling information in a restaurant.

In the past, in restaurants of substantial size it was difficult at best to continuously determine table status, since this was done by word of mouth from waiters in the various rooms of the restaurant to the Maitre D'. In addition, orders for food and drinks had to be carried from the patrons of the restaurant to the kitchen area. After the patrons had completed their meal the check had to be totalled by the waiter and given to the patrons. The credit card or money received by the waiter in payment of the bill then had to be carried to a remotely positioned cash register with the change then returned to the patron. The aforementioned tasks were time consuming and resulted in many inefficiencies which increased the overhead costs of the restaurant and hence resulted in increased cost of food to the patrons. In addition, in the past, inventory control was periodically made by the chef or a manager which resulted in rather loose inventory control. Thus, once again, the increase in the cost of overhead resulted because of the extra inventory required because of lack of stringent controls thereof.

Recently, attempts have been made to provide automatic inventory control and restaurant service systems to improve the efficiency of restaurants and reduce overhead expenses. For example, Auger discloses in U.S. Pat. No. 3,310,797 a system for coordinating the operation of a restaurant wherein telephone communication from each of a plurality of rooms to a central console 30 was provided to determine the occupancy status of the tables in each of a plurality of rooms.

In addition, Wolf discloses in U.S. Pat. No. 3,304,416 a business order control system wherein the waitress identification number, the order number of an item and the quantity thereof was keyed into a console which was positioned in a restaurant or into one of a plurality of outside consoles which were positioned outside of the restaurant. A display on the console confirmed to the waitress that the correct code number had been keyed into the console. The information keyed into the console was then coupled to a tape punch unit afterwhich the tape was coupled to a tape reader. The output of the tape reader was coupled to a typewriter which typed the order keyed into the internal or external consoles. At the same time, the output of the tape reader was coupled to a translator storage unit which stored the price and description of the item corresponding to the coded input. The output of the translator was coupled via the tape reader to a calculator which calculated the total bill. The value of the bill was then coupled back to a typewriter for printing out of the bill for the customer.

This system also included a record display system in the form of a display board. As an order was filled, a reversible stepper switch was actuated to decrement the number of a particular item on back order. This provided information to the chef as to how many of a particular item are on back order. The Wolf system also includes an indication of how many of a selected item are in storage so that an accurate inventory check could be made on a continuous basis.

The aforementioned system requires that a plurality of consoles be positioned at predetermined locations within and outside of the restaurant. This requires that the order first be recorded by means of pencil and paper and then hand delivered to the console after which the order is inputted to the control system. Accordingly, while the aforementioned system did provide an improvement in the efficiency of the operation of restaurants, this system included a notable drawback in that the double recording of an order was required in each instance.

Accordingly, it is an object of the present invention to provide an improved restaurant management and control system.

It is another object of this invention to provide an improved management information and control system for substantially decreasing the work required and time expended in the receiving and transferring of orders within a restaurant.

SUMMARY OF THE INVENTION

This invention relates to an improved restaurant management information and control method and apparatus wherein the apparatus includes a plurality of remote units capable of being easily carried by waiters.

Each remote unit which may be a simple order by number unit or may provide two-way communication with a central processor includes a keyboard, a display, and a memory. In addition, a central interrogator transceiver is provided which periodically interrogates each of the remote units afterwhich the remote units transmit information keyed thereinto back to the central interrogator transceiver. The central interrogator transceiver couples the information transmitted thereto to the central processor which has a high speed memory. The central processor operates on the information received to provide order information to a kitchen display, an order assembly display, a service bar display, a table status display and to a check printer-cash register unit. The check printer-cash register unit types a bill or check for the customer as each item is ordered. The table status display illustrates to the host or Maitre D' what tables are available for use and the current status of each of the tables. The central processor also provides an inventory control for decrementing the various items in inventory by the quantity of the items ordered by a customer and provides information for restaurant management with regard to the operational characteristics thereof such as food flow, customer traffic, etc. In addition, if the remote unit is designed for two-way communication, the central processor communicates with the remote units.

BRIEF DESCRIPTION OF THE DRAWING

A complete understanding of the invention can be obtained from the following detailed description when read in conjunction with the annexed drawing in which:

FIG. 2 is a detail showing of the face or front panel of a preferred embodiment of a waiter remote unit of the invention.

DETAILED DESCRIPTION OF THE INVENTION

Figure 1:
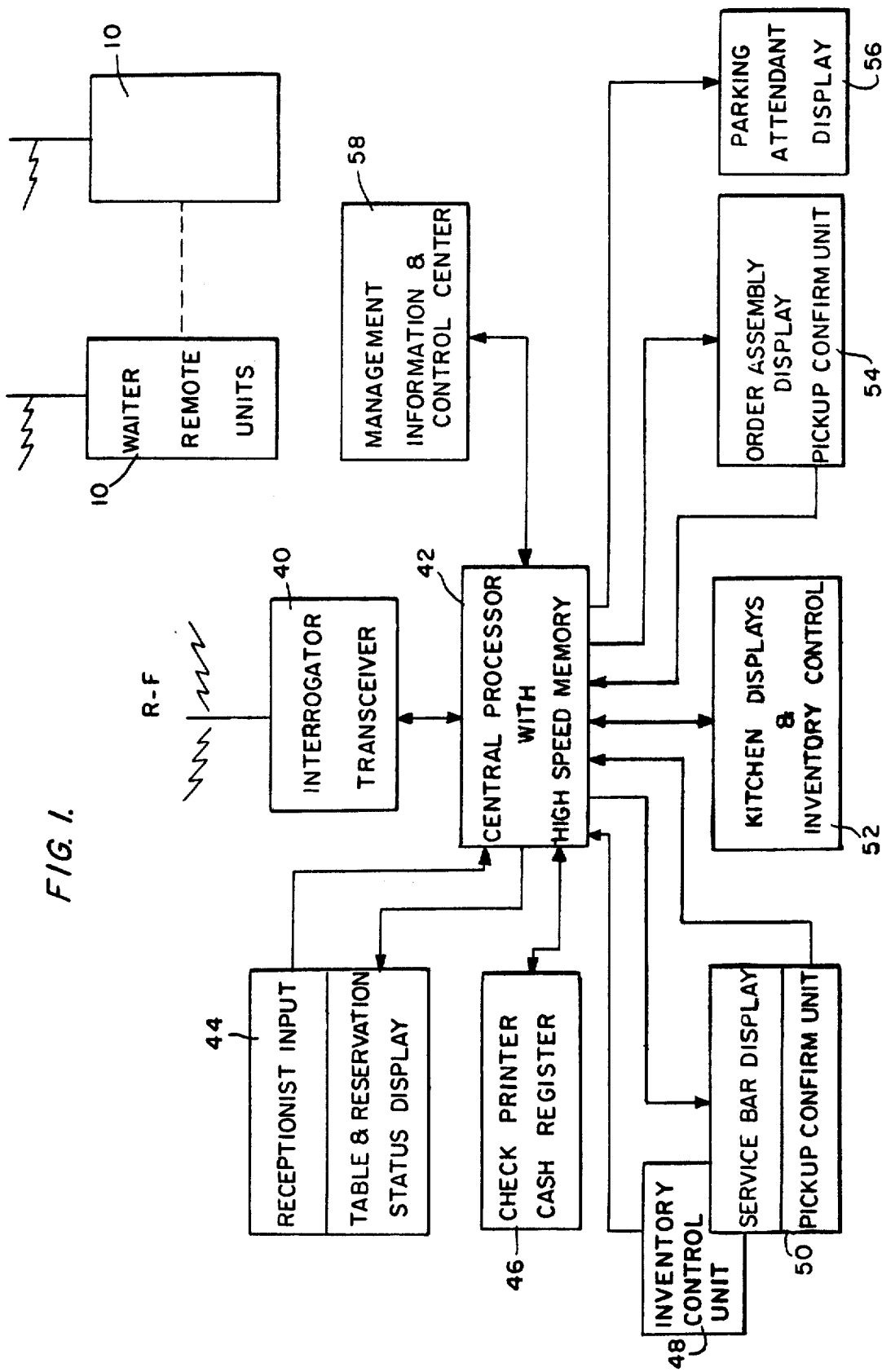
FIG. 1 is a block diagram of a preferred embodiment of the management information and control system of the invention.

Referring to FIGS. 1 and 2 of the drawing, a waiter remote unit 10, a plurality of which are provided as indicated in FIG. 1, includes, as shown in FIG. 2, a keyboard 22 having the plurality of keys or buttons labeled 0 through 9, an on-off switch or button 24, a table number button 30, a same seat button 28, a same table button 26, table number display 32, a seat number display 34 and a plurality of displays 11 through 20. 11 through 20 are associated with the keys or buttons 0 through 9 respectively. Remote units 10 are small portable units that can be held in the hands of a waiter.

Referring back to FIG. 1, the central units comprises an interrogator transceiver 40, a central processor with high speed memory 42 coupled to interrogator transceiver 40 and a receptionist input and table and reservation status display unit 44, a check printer cash register unit 46, an inventory control unit 48, a service bar display and pickup confirm unit 50, a kitchen display and inventory control unit 52, an order assembly display and pickup confirm unit 54, a packing attendant display unit 56 and a management information and control center unit 58, all coupled to control processor unit 42.

The remote unit 10 shown in FIG. 2 is capable of two-way communications. That is, remote unit 10 contains a transmitter and a receiver. The remote unit shown in detail in FIG. 2 is capable of two-way communication with interrogator transceiver 40. A second embodiment of remote units 10, not shown in detail in the drawing, provides only one-way communication. This embodiment, hereinafter referred to as the "transmit only embodiment" provides communication from each remote unit 10 to interrogator transceiver 40 but not from interrogator transceiver 40 to each remote unit 10 except that interrogator transceiver 40 transmits a different coded interrogation signal to selectively activate each of the transmit only remote units.

The transmit only embodiment of the remote units 10 is not shown in detail in the drawing since both embodiments are essentially identical in appearance except that the displays 11 through 20 (FIG. 2) of the two-way communications embodiment of remote units 10 are replaced by a single display in the transmit only embodiment. The actual circuitry for either of the two embodiments of remote units 10 is also not shown in detail since conventional circuits are used in both embodiments. In the two-way communications embodiment of remote units 10, a radio transmitter, a radio receiver, a memory, and appropriate processing and display circuits are provided. In the transmit only embodiment, the remote units 10 each contain a radio transmitter, a simple receiver capable of receiving a coded interrogation signal, a short time memory and appropriate processing and display circuitry. In both embodiments, these circuits are well known conventional circuits. While the transmit only embodiment of remote units 10 is not shown in detail in the drawing as is the two-way communications embodiment of remote units 10 (FIG. 2), the remote units 10 shown in FIG. 1 do represent both embodiments. The specific electrical circuits and components used in both embodiments and in the central unit are all known conventional circuits and components; therefore, these circuits are not shown in detail in the drawing.

The operation of the apparatus of this invention will first be described with reference to the transmit only embodiment of the remote unit.

When a waiter serves a given table, he first indicates the table being served by depressing table number button 30 and then inserts the table number by depressing the appropriate keys of keyboard 22. In FIG. 2, display 32 indicates that table No.32 is being served; thus the waiter has depressed keys 0,3,2 of keyboard 22. On-off switch 24 must, of course, be in the on position. In this transmit only embodiment, as will become apparent, the waiter should turn his remote unit on and keep it on until he is either off duty or at least until all of his tables have been served or he does not presently have any customers.

When the waiter keys in the table number, this number not only appears on display 32, but is also stored in the memory of remote unit 10. The waiter then indicates the seat in which the customer whose order he is taking is seated by keying in the appropriate seat number by means of the keys of keyboard 22. FIG. 2 indicates that seat No. 4 is being served; therefore, the waiter had depressed the 0,4 keys in that order. The number 04 is displayed on display 34 and is stored in the memory of remote unit 10.

The waiter then takes the order of the customer. This is accomplished by means of the keys of keyboard 22. Each item in the restaurant has a code number, the appropriate code for the item ordered is inputted by depressing the proper ones of the 0-9 keys of keyboard 22. The code number inputted by the waiter appears on the single display that replaces displays 11 through 20 and is stored in the memory of remote unit 10. If the code number inputted by the waiter is an improper number, no number will appear on the display indicating that a wrong code has been inputted. If the code number is in error, it will not be stored in the memory of remote unit 10.

After the order of the patron in seat number 4 entered in the memory of remote unit 10, the waiter enters the orders of the rest of the patrons at that table by first depressing the same table button 30. The waiter then enters the seat number by depressing the appropriate keys of keyboard 22. This patrons order is then entered by depressing the keys of keyboard 22 that correspond to the code number of the item being ordered by that customer.

The memory contained in remote unit 10, is capable of storing, at any given time, orders from a plurality of customers. Thus, if the numbers of orders from a given table is less than the storage capability of the memory in remote unit 10, which will generally be the case, the waiter can go to his next table and enter the orders of the customers of this table by entering the table number and repeating the process described above.

The information stored in the memory of remote unit 10 remains stored until read out on command from interrogator transceiver 40 of the central unit. Interrogator transceiver 40 transmits an interrogation signal to which the transmitter of given remote unit 10 responds to read out the information stored in the memory of that remote unit 10. The transmitter reads out the stored information sequentially, on a first-in first-out basis and transmits this information to interrogator transceiver 40.

The transceiver 40 demodulates the transmitted information from the interrogated remote unit 10 and couples the information in digital form to central processor 42 which may be of any conventional design known in the art and preferably is in the form of a mini-computer. Central processor 42 has a high speed memory to which the order information is initially coupled.

The central processor generates a first set of signals indicating the status of the table being attended to by the waiter. Thus, as the waiter takes the order, the table reservation and status display provides an indication to the host or Maitre D' that the table is occupied. When the customers leave the table, the waiter keys into the remote unit 10 the fact that the table is no longer occupied but that it is not yet ready for new customers. Finally, when the table is ready for new customers, the waiter keys into the remote unit 10 this information all of which is coupled to the table and reservation status display 44 via transceiver 40 and central processor 42. At the same time, the host can input to the central processor information such as reservation times for selected tables as desired so that on the display there will always be an indication whether use of a particular table should be deferred because of a prior reservation therefor.

The central processor also provides an output to order assembly display and pickup confirm unit 54 which lists the items ordered from each table. As the respective items are prepared by the kitchen and picked up by the waiter for delivery to the table, the pick-up confirm portion of unit 54 is actuated to erase the order display or the particular table. In addition, as order information from each table is provided to the central processing unit, central processing unit 42 provides an output to kitchen display and inventory control unit 52 which displays to the kitchen personnel what items of food are on back order. After each item ordered, has been prepared and sent to a pick-up location and subsequently picked up by the waiter, the display for that particular item is decremented by a count of one or completely erased from the display if only one such item has been ordered by customers of the restaurant. In addition, at the time of displaying the item ordered in kitchen display and inventory control unit 52, the stored count of the number of units of food required in the item ordered is decremented by a count of one by the inventory control portion of unit 52 so that a continuous updating of the inventory is maintained as each item of food is ordered.

In a manner somewhat similar to the operation of the kitchen display and the order assembly display, service bar display and pick-up control unit 50 displays to a bartender, the number and types of drinks ordered and the backlog of each type of drink. As each order of drinks is picked up, the waiter confirms receipt of the drinks at service bar display and pick-up confirm unit 50. When pick-up has been confirmed, the number of each particular drink on backorder is appropriately decremented by the number of such drinks picked up so that the bartender has a continuous display before him of the number and types of drinks which he has to prepare.

At the same time that the bartender is preparing the ordered drinks, inventory control unit 48 decrements by the number of drinks ordered, the quantity of the respective beverage in inventory so that a continuous inventory of the drinks provided by the restaurant is maintained.

When the customers have completed their meal, central processor 42 generates information to check printer-cash register 46 which types a bill indicating each item ordered, the quantity thereof, the price per unit, and the total price together with the computed tax for the total bill. The printed check or bill is then delivered to the customer for payment. In addition, the information coupled to the check printer-cash register is utilized to generate a running account of the value of food and drink sold together with the value of each particular item sold throughout a predetermined period of time such as a day, a week or a month.

In order to provide better service as each table is cleared, that is, as the customers prepare to leave the restaurant, an advance signal in coded form for each customer is coupled to parking attendant display 56 which provides to the parking attendant information as to what customers are leaving the restaurant. The parking attendant can then obtain the customer's car and drive it to the door of the restaurant so that the customers will have their car ready to drive off as they leave the restaurant.

Management information and control center 58 is a memory unit for providing such information as the number and identification of the waiters working on a particular day, the rate of turnovers of customers, the flow of food, information such as for example, which items of food sell best on particular days, and at what times thereof. What items of food are most profitable, time variable statistics such as whether the number of customers are increasing or decreasing over a period of time and other such information which may be helpful to the restaurant management in determining how best to serve the customers and minimize cost.

While the transmit only embodiment of remote unit 10 operates satisfactorily in conjunction with the central system, the interrogator transceiver 40, central processor 42, etc., to provide an efficient restaurant management and information control system, the transmit only embodiment of remote unit 10 is somewhat limited and if a particular restaurant has a large selection of items that can be ordered, the required code system could become complex and cumbersome. The waiter could not possibly remember all of the code numbers of a large number of items and would, therefore, have to be constantly referring to the menu to check the code numbers. Further, there are such a large number of possible variations of drinks, such as cocktails (i.e., on the rocks, up, with lemon twist, with olive, etc.) that the cocktail menu alone would become rather unweildy. The two-way communications embodiment of remote units 10 overcomes these limitations of the transmit only embodiment.

In the following description of the apparatus of this invention with the two-way communication embodiment of remote units 10, it is assumed that the restaurant is one having a large number of entries, a full bar service and a varied wine cellar. Further, it is assumed that two couples seated at table No. 32 are being served.

The waiter turns on his remote unit 10 by placing on-off button 24 in the on position. The waiter then depresses table number button 30 and inserts the table number by depressing the appropriate keys of keyboard 22, in this case 0,3 and 2 in that order. The table number is then displayed on table number display 32 and is inputted to the memory of central processor 42 via interrogator transceiver 40. Note in this case interrogator transceiver 40 need merely be a transceiver. The receiver portion of transceiver 40 must be a receiver capable of receiving a plurality of messages since more than one remote unit 10 may be communicating at any given time. This can be accomplished in several different known ways. For example, the receiver portion of transceiver 40 could be a multichannel receiver, one channel for each remote unit. Central processor 42 would then be designed to appropriately process the multichannel information. While such a multichannel receiving system operates satisfactorily any known system capable of receiving and appropriately processing the multiple messages can be used, such as time sharing. In response to the table number input, central processor 42 via transceiver 40 transmits the following display information which received by remote unit 10 and displayed on displays 11 through 20. (For reference purposes in describing the operation of the system each display is hereinafter given an alphabetical title, the title is for reference only.)

| DISPLAY A | | |
|---|---|---|
| 0 | BAR | 11 |
| 1 | APP | 12 |
| 2 | SOUP | 13 |
| 3 | ENTR | 14 |
| 4 | VEG | 15 |
| 5 | SAL | 16 |
| 6 | WINE | 17 |
| 7 | DES | 18 |
| 8 | BEV | 19 |
| 9 | AUX | 20 |

The foregoing displays are abbreviations for bar service, appetizer, soup, entree, vegetable, salad, wine, dessert, beverage and auxilliary. The function of auxilliary display 20 associated with key 9 in Display A will be described later.

Assume that the four customers decide on cocktails, and specifically that two extra dry Beefeater martinis, on the rocks, with a lemon twist, one whisky sour on the rocks and a perfect Rob Roy up, are ordered. The waiter then, according to Display A, pushes the 0 key to indicate that a bar order is being given. In response to the depressing of the 0 key, the following display is transmitted to remote unit 10 from central processor 42 via transceiver 40:

| DISPLAY B | | |
|---|---|---|
| 0 | SEAT | 11 |
| 1 | NO. | 12 |
| 2 |  | 13 |
| — |  | — |
| — |  | — |
| 9 |  | 20 |

The waiter then depresses the keys 0,1,0,3 in that order to indicate that the customers in slots 1 and 3 have the same order; it being assumed that these are the customers ordering the martinis. The number 01 will first appear on seat number display 34 and the number 03 will appear on this display. These numbers are transmitted to interrogator transceiver 40 which couples the information to central processor 42.

After the seat numbers 1 and 3 have been inputted by the waiter, the following display from central processor 42 appears on remote unit 10:

| DISPLAY C | | |
|---|---|---|
| 0 | GIN | 11 |
| 1 | VOD | 12 |
| 2 | BOUR | 13 |
| 3 | SCOT | 14 |
| 4 | RYE | 15 |
| 5 | RUM | 16 |
| 6 | BRAN | 17 |
| 7 | WINE | 18 |
| 8 | NONA | 19 |
| 9 | AUX | 20 |

These displays are abbreviations for gin, vodka, bourbon, scotch, rye, rum, brandy, wine, non-alcoholic and auxiliary. The auxiliary display is provided in case the list of possible bar items is more than ten and none of those items listed in Display C represent the item ordered. Depressing of auxiliary button 9 will provide a new list of bar items on displays 11 through 19 from central processor 42, with display 20 again indicating auxiliary.

In this case, the basic ingredient (gin) of the drinks ordered by the customers sitting in seats 1 and 3 does appear on display 11 which is associated with key 0. Therefore, the waiter depresses the 0 key and the following display from central processor 42 will appear on Displays 11 through 20:

| DISPLAY D | | |
|---|---|---|
| 0 | MART | 11 |
| 1 | FIZZ | 12 |
| 2 | TONI | 13 |
| 3 | — | 14 |
| 4 | — | 15 |
| 5 | — | 16 |
| 6 | — | 17 |
| 7 | — | 18 |
| 8 | — | 19 |
| 9 | AUX | 20 |

In Display D, MART stands for martini, FIZZ for gin fizzy, TONI for gin tonic and AUX for auxiliary. The displays 14 through 19 will have other gin drinks listed and auxiliary display 20 is maintained to provide a new list by depressing the 9-key if Display D does not contain the desired gin drink. In this case martinis are being ordered, therefore, the waiter depresses the 0 key.

In response to depressing the 0 key the associated key for martinis in Display D, the following display transmitted from central processor 42 via transceiver 40 appears on Displays 11 through 20 of remote unit 10:

| DISPLAY E | | |
|---|---|---|
| 0 | ROCK | 11 |
| 1 | DRY | 12 |
| 2 | XDRY | 13 |
| 3 | XXDR | 14 |
| 4 | TWIS | 15 |
| 5 | OLIV | 16 |
| 6 | BAR | 17 |
| 7 | BEEF | 18 |
| 8 | GILB | 19 |
| 9 | AUX | 20 |

The foregoing abbreviations displayed on displays 11 through 20 in Display E stand for ice, dry, extra dry, pure gin, lemon twist, olive, bar gin, Beefeater gin, Gilbey's gin and auxiliary, respectively. Again auxiliary is provided to permit the display of a new list of descriptors if Display E does not contain the appropriate descriptors.

In this case, the martinis ordered by the customers in seats 1 and 3 are fully displayed in Display E. Thus, the waiter depresses the 0 key for ice, the 2 key for extra dry, the 4 key for lemon twist and the 7 key for Beefeater. The waiter then depresses the auxiliary key 9 to indicate that this is the complete order for that particular drink. In this case the auxiliary key must be depressed to provide an order ready signal since part of the order could be transmitted out before the order is complete. In fact in all cases (Deploy A, B, C, D and additional deploys described hereinafter) the auxiliary key may be used to provide an order ready signal to prevent partial read-out of an order from a remote unit. Whether or not the auxiliary key is used in this manner depends upon the program in central processor 42. Using the auxiliary key as an order ready signal key, in addition with other functions described hereinafter, in all cases is the preferred mode of operation since no information would be transmitted out of a remote unit 10 until the auxiliary key is depressed. In this manner, no partial orders would be inadvertently transmitted out of a remote unit to control processor 42. In the following description of the balance of the operation, the depressing of the auxilliary key in each display to provide an order ready signal is not mentioned since this use of the auxiliary key is not absolutely essential to operate the system. That is, the system can be designed and programmed, as will be obvious to those skilled in the art, to accept orders in pieces and properly assemble the pieces in central processor 42 by merely depressing and programming central processor 42 to accept orders. However, the use of the auxiliary key in each display to provide an order ready signal before transmitting out the information for given items is the preferred mode of operation since this mode of operation assures that no partial orders are inadvertently transmitted out of the remote unit 10. The waiter is required to perform a positive act before any item ordered is transmitted out of a remote unit 10.

After auxiliary key 9 is depressed the information (ice, extra dry, lemon twist and Beefeaters) is transmitted out of remote unit 10 to interrogator transceiver 40 which couples this information to central processor 42. The whisky-sour drink and the Rob Roy are processed by the waiter in the same manner that the two martinis were inputted to central processor 42. First, the waiter depresses same table button 26. In response to depressing same table button 26, Display A appears. The waiter then depresses the 0 key of keyboard 22 to indicate a bar order and Display B appears on remote unit 10. The waiter then depresses the appropriate keys of keyboard 22 to indicate the seat number of this order. In response to the seat number, Display C is transmitted to remote unit 10 from central processor 40 via transceiver 42. Assuming, the whisky-sour is now being processed by the waiter, he depresses the 2 key of keyboard 22 since this key is associated with the display BOUR (bourbon).

In response to the bourbon input transmitted from remote unit 10, central processor 42 transmits a display similar to Display D to remote unit 10 via transceiver 40. In this case the display is a list of bourbon drinks rather than gin drinks as in Display D. Assume that the whisky-sour is displayed on display 14, which is associated with the 3 key of keyboard 12, if this is the case the waiter depresses the 3 key thereby notifying central processor 42 that a whisky-sour is being ordered. In response to this information, central processor 42 provides remote unit 10 with a display similar to Display E. In this case the display will list the appropriate garnishments for whisky-sours rather than martinis (i.e., XSOU for extra sour rather than XDRY for extra dry as in Display E for martinis). The identical procedure is followed to order the Rob Roy up. In this case the display related to Display D will list scotch drinks and the display related to Display E will list garnishments for the Rob Roy.

There are, of course, many different variations of drinks; therefore, a given customer may order a drink that is not provided for on any of the lists of drinks. This situation would be handled by an auxiliary waiter call. This can be accomplished by including a special order display with one of the bar list displays available from central processor 42 or the auxiliary display of the last list available can be used for this purpose. Thus, if a special order display is provided, the waiter merely depresses the key associated with this display and an auxiliary or special order waiter is dispatched to the table. If this function is tied to the auxiliary display, the waiter not finding the particular drink on a given list will continue to depress the 9 key associated with the auxiliary display and after all the lists have been displayed, the depressing of 9 key will automatically through central processor provide for a special waiter after the last available list has been displayed.

Assume that the customers at table 32 wish to order their appetizers immediately rather than waiting until after they receive their cocktails. The waiter merely depresses same table button 26 and in response thereto Display A from central processor 42 is transmitted to remote unit 10. In Display A, APP (appetizer) is displayed in display 12 associated with the 1 key of keyboard 22; therefore, the waiter depresses the 1 key. In response thereto, Display B is transmitted to remote unit 10 and the waiter inputs the seat number or seat numbers if more than one person has the same order by depressing the appropriate keys of keyboard 22. In response to the seat number input, central processor via transceiver 40 transmits the appetizer list to remote unit 10 for display or displays 11 through 20. Generally, only one list will be necessary since the number of appetizers and/or soups available is generally small even in large restaurants and no modifiers or descriptors are required. If more than ten items are available, display 20 can be an auxiliary display to call up the next list. In any event, the waiter then depresses the proper key of keyboard 22 to transmit the first appetizer order to central processor 42 and then repeats the steps of depressing same table button 26, depressing the 1 key of Display A for appetizers inputting the seat number and then depressing the key of keyboard 22 associated with the desired appetizer on the appetizer list displayed on displays 11 through 20. This process is repeated until the appetizer orders of all four customers at table 32 have been transmitted to central processor 42.

The main course can be ordered immediately or after the cocktails and appetizers have been served. Assuming the main course is ordered later, the waiter returns at the appropriate later time, depresses table number button 30 and the 0,3,2 keys of keyboard 22. In response to this input, central processor again provides Display A. The waiter then depresses the 3 key of keyboard 5 which is associated with the ENT (entree) display. In response to this input, central processor 42 provides Display B and the waiter depresses the appropriate keys of keyboard 22 to indicate the seat or seat numbers if more than one customer has the same order. In response to the seat number input, central processor 42 via transceiver 40 transmits the following display to remote unit 10 for display on displays 11 through 20:

| DISPLAY F | | |
|---|---|---|
| 0 | BEEF | 11 |
| 1 | VEAL | 12 |
| 2 | LAMB | 13 |
| 3 | PORK | 14 |
| 4 | FOWL | 15 |
| 5 | FISH | 16 |
| 6 | SHEL | 17 |
| 7 | PAST | 18 |
| 8 | SAL | 19 |
| 9 | AUX | 20 |

In Display F, the abbreviations stand for the following: SHEL shellfish; PAST pasta; SAL salad and AUX auxiliary. If the customer or customers sitting in the seat or seats inputted into central processor 42 order a beef dish, the waiter depresses the 0 key associated with beef display 11 or if a fish dish is ordered the 5 key is depressed. When the 0 key is depressed, central processor in response to this input provides a list of the beef dishes available. Similarly, if the 5 key is depressed central processor 42, will provide a list of the fish dishes, etc. The beef and fish categories may each include a number of items greater than 10. If this is the case, the beef or fish display, as the case may be, that will appear first will contain the nine most popular beef or fish items with display 20 displaying AUX for auxiliary. If the specific item ordered does not appear on the list displayed, the waiter depresses the 9 key associated with the auxiliary display to call up a new list. Generally, if a restaurant has more than ten beef or fish items, the number of such items will not be much greater than ten; thus, the beef dishes may appear in the list of veal items more generally no more than a few veal items are found on a restaurant menu. Similarly, the additional fish items may appear on the list of shellfish items since the total number of additional fish and shell items will generally be less than ten. In this manner the number of lists needed is reduced. However, it is not necessary that any lists be combined.

Returning to the entree order, assume that the order of the customer seated at seat 4 of table 32 is to be the first entree order of this table to be inputted to central processor 42 and that this customer is ordering from the beef list. As stated above, the waiter after returning to table 32 inputs this table number by depressing table number key 30 to obtain Display A. The waiter then depresses the 3 key of keyboard 22 to inform the central processor that entree order is being given. In response to this input, central processor 22 provides display B and the waiter in this case then depresses the 0 and 4 keys in that order to indicate that the order to be inputted is the order of the customer at seat 4. In response to the seat number information, central processor 42 provides Display F. Since it was assumed that the customer at seat 4 ordered from a beef list, the waiter depresses the 0 key to obtain the list of beef dishes from central processor 42. This list is displayed on displays 11 through 19 or through 20, if only ten items are available. The waiter then depresses the key of keyboard 22 associated with the display that displays the item ordered.

The person ordering the beef dish will, of course, order specific vegetables and perhaps a salad. Same seat key 28 provides for inputting a complete order of one customer before the order of the next customer at that table is inputted. After depressing the proper key for the beef dish ordered, the waiter depresses same seat button 28. In response to this input, central processor 42, of course, via transceiver 40, again transmits Display A to remote unit 10. The waiter then depresses the 4 key associated with the vegetable display of vegetables are ordered and in response thereto central processor 42 provides remote unit 10 with the list of vegetables on the menu. The waiter then depresses the appropriate key of keyboard 22 to input the vegetable ordered or the appropriate keys of keyboard 22 if more than one vegetable is ordered. If the customer at seat 4 also orders a salad, the waiter again depresses same seat button 28 to again obtain Display A and then depresses the 5 key associated with salad display 16 in Display A. In response to this input central processor will provide a list of salads if more than one is available and included in the same list will be the choice of dressings available. The waiter then depresses the appropriate key or keys of keyboard 22 to input the salad and dressing. If a beverage is also ordered, the waiter again depresses same table button 28 to obtain Display A then depresses the 8 key associated with the beverage display 19 is Display A to obtain the list of beverages available. The appropriate key of keyboard 22 is then depressed to order the beverage. In this manner, one complete main dish order can be inputted before entering the order of the next customer. The order of the next customer is then taken by depressing same table button 26 to again obtain Display A. The foregoing described steps are repeated to input this customer's order, and so on until the orders of all the customers at table 32 have been inputted.

If the customers at table 32 order wine with their meal, the waiter again pushes same table button 28, assuming the wine order is inputted after the main orders, to again obtain Display A. If the wine order is inputted first or at some other time then, of course, the table number has to be inputted first by depressing table number button 30 and the 0,3,2 keys. In response to depressing same table button 28 or again inputting the table number, as the case may be, Display A is again provided to remote unit 10. The waiter then depresses the 6 key of keyboard, the key associated with wine display 17 of Display A. Central processor 42 can then provide a wine list for display on display 11 through 20 or more conveniently can merely request the number since the wine menu may conveniently include code numbers for each wine. If the wines are number coded, the abbreviation NUMB would appear on display 11 in response to the depressing of the 6 key (the wine key) in Display A. The waiter then merely depresses the appropriate keys of keyboard 22 to input the code number of the wine ordered. The use of code numbers for the wine order also permits an additional degree of flexibility in that quantity along with brand of wine can be inputted. For example, assume that the customers at table 32 order three bottles of the wine having the code number 7. To input this order, the waiter depresses the 0 key twice, then the 7 key and then the 3 key in that order to input the number 0073 thereby informing central processor 42 that three bottles of the number 7 wine have been ordered by the customers at table 32. Returning to Display A, the auxiliary display 20 associated with the 9 key in Display A serves to provide the additional functions of cancelling a previous order, calling for computation of the check, calling the manager or maitre D' and notifying the parking lot attendant. When Display A is present on displays 11 through 20 of remote unit 10 and the waiter wishes to request one of these four functions, he merely depresses the 9 key which is associated with auxiliary display 20 of Display A. In response to this input from remote unit 10, central processor 42 transmits, through transceiver 40, the following display to remote unit 10:

| DISPLAY G | | |
|---|---|---|
| 0 | CANC | 11 |
| 1 | TOTL | 12 |
| 2 | MGR | 13 |
| 3 | PARK | 14 |
| — | — | — |
| — | — | — |
| — | — | — |
| 9 | | 20 |

In Display G, the abbreviations are CANC cancel; TOTL request for check; MGR manager or Maitre D' and PARK parking lot.

Display A appears on remote unit 10 in response to the depressing of table number button 30 or the depressing of same table number button 26 if the table number has already been inputted. Thus, the table number has already been established, which under the assumptions made herein is table number 32. Assume that the customer at seat 4 wishes to either cancel the balance of his order not yet served or wishes to make a change in the part of his order not served. And that Display G has been obtained from central processor 42 in the manner described above. To cancel or change the order of this customer, the waiter depresses the 0 key which is associated with display 11 of Display G and enters the seat number via keyboard 22. In response to this input, central processor 42 provides remote unit 10 with a list of the outstanding order (the part not yet served) of this customer. Assuming that the main course is the only part outstanding and that this customer ordered a beef dish with baked potato, zucchini and a salad as the main course, the following list from central processor 42 is transmitted to remote unit 10 by transceiver 40:

| DISPLAY H | | |
|---|---|---|
| 0 | BEEF | 11 |
| 1 | BPOT | 12 |
| 2 | ZUCH | 13 |
| 3 | SAL | 14 |
| — | — | — |
| — | — | — |
| 9 | | 20 |

Thus, Display H gives a list of the items not served. If the customer has decided to cancel one or more of the items listed in Display H, the waiter merely depresses the appropriate key or keys of Keyboard 22 when Display H is being displayed on remote unit 10. If a new item or items is to be substituted for the cancelled item, each substituted item is ordered in the same manner in which the original order was processed.

In order to avoid going through all the original steps to reorder a cancelled item, central processor 42 can be programmed to immediately provide the appropriate list for the item cancelled. For example, if the beef order is to be cancelled and a new order placed, central processor 42 would in response to the depression of the 0 key when Display H is present, provide remote unit 10 with Display F and the waiter would then follow the steps previously described to substitute the new item for the cancelled beef item. Similarly, cancelling one or both of the vegetables would result in the display of Display F so that a different vegetable or vegetables can be ordered and cancelling of the salad would result in a re-display of Display F so that a new salad can be ordered. If, after a given period of time, no new item is substituted, the display from which this substituted item would be inputted will be cancelled by a signal from central processor 42 or by a timing circuit in remote unit 10, and central processor 42 would merely indicate the cancellation without any substitution. However, greater flexibility can be obtained by adding a cancel function in Display A. That is, in addition to the items listed in Display H, one of the displays 11 through 20 would display CANC for cancel. In Display H assume that this cancel function is displayed in display 20 which is associated with key 9 of keyboard 22. To cancel all the items listed in Display H as not having been served, the waiter would merely depress the 9 key thereby cancelling all the items. If, on the other hand, this customer wishes, for example, to cancel his salad order without substituting a new order, the waiter depresses (in Display H) the 3 key for salad and the 9 key for cancel. If a substitute is to be ordered, the 9 key is not depressed and central processor then provides the salad. Similarly, if the Zucchini is to be cancelled with no substitution, the waiter depresses the 2 key and the 9 key, but if a substitute is to be ordered only, the 2 key is depressed, central processor 42 then provides the vegetable list.

After the customers at table 32 have completed their meal and request their check, the waiter depresses table number button 30 to obtain Display A, the 9 key in Display A to obtain Display G and then the 1 key in Display G. In response to the depressing of the 1 key in Display G, central processor 42 provides the following display on remote unit 10:

| DISPLAY I | | |
|---|---|---|
| 0 | TABL | 11 |
| 1 | SEAT | 12 |
| — | — | — |
| — | — | — |
| — | — | — |
| 9 | | 20 |

If the customers request a single check, the waiter depresses the 0 key, the TABL (table) key in Display I. In response to this input, central processor 42 provides the following list to remote unit 10:

| DISPLAY J | | |
|---|---|---|
| 0 | CASH | 11 |
| 1 | CHCK | 12 |
| 2 | AMEX | 13 |
| 3 | BAMC | 14 |

-continued

| DISPLAY J | | |
|---|---|---|
| 4 | MCHG | 15 |
| 5 | DINC | 16 |
| 6 | BILL | 17 |
| — |  | — |
| — |  | — |
| 9 |  | 20 |

In Display J, cash is cash, CHCK is check, AMEX is American Express credit card, BAMC is BankAmericard, MCHG is Master Charge, DINC is Diner's Club and BILL is direct billing. The waiter then depresses the appropriate key of keyboard 22 in Display J to indicate the method of payment and the check is printed and totaled by check printer cash register 46 for presentation to and payment by the customers.

In addition to merely indicating which credit card is to be used, the card number can be inputted for printing on the customer's bill. To accomplish this, a further step is added. After the appropriate key of keyboard 22 for the particular credit card is depressed in Display J, central processor 42 transmits the request for the card member to remote unit 10. This request is conveniently displayed on display 11 of remote unit 10 as C-No.? The waiter then merely depresses the keys of keyboard 22 in the proper sequence to transmit the credit card number.

Since table 32 has two couples, the couples may desire separate checks. Referring back to Display I, the waiter depresses the 2 key for seat. In response to this input central processor 42 requests the seat number from remote unit 10, this can be displayed in display 11 as S-No. on remote unit 10. Assuming one couple occupies the seats 1 and 2, the waiter then depresses the 0 key, the 1 key, the 0 key and the 2 key (0102) and in response to this input, central processor 42 transmits Display J to remote unit 10. The waiter then depresses the appropriate key of keyboard 22 to indicate the method of payment. If a credit card is to be used and the system provides for the printing of the number on the check, the credit card number is then inputted. The same procedure is followed for obtaining the check for the couple occupying seats 3 and 4.

Referring back again to Display G, a situation may arise that requires the immediate attention of the manager. To call the manager, the waiter depresses the 2 key in Display G and in response to this input, central processor 42 requests the table number. This request for the table number is displayed in display 11 of remote unit 10 as T-No. for example. The waiter then inputs the table number and central processor 42 then transmits the request for the manager at this table to either management and information control center 58 or receptionist input and table reservation status display unit 44 or both or preferably to all the units of the central system since the manager may be moving from place to place.

Referring again to Display G, if the restaurant has a parking lot and a parking lot attendant, the waiter can notify the parking lot attendant so that he can have their car ready for them when they leave the restaurant. To identify the proper automobile, the parking lot would have numbered spaces and the customer would be given a ticket or token with the number of the parking space in which the attendant will park his automobile when the customer enters the restaurant. With Display G being displayed on remote unit 10, the waiter depresses the 3 key for the parking lot attendant, central processor then requests the parking space number which the waiter obtained from the ticket or token. The waiter then depresses the appropriate keys of keyboard 22 of remote unit 10 and this request is forwarded to parking attendant display 56. Note instead of having the waiter notify the parking attendant, the person at check printer cash register unit 46 or the person at receptionist table reservation status display can perform this function, since all the various units of the central system are capable of communicating with central processor 42 as is indicated by the dual arrows in the lines connecting these units to central processor 42.

In addition to the functions described, the system can also perform other functions. For example, if the restaurant is crowded and people are waiting, the manager through central processor 42 can inform a given waiter that the customers at a particular table have been there too long in view of the backlog. The waiter can then politely attempt to get these customers finished and out of the restaurant. In addition, other information can be communicated to the waiter from central processor 42. This information can be displayed on displays 11 through 20. Instead of waiting for such information to be transmitted to his remote unit, the auxiliary display in Display A can be used to request information in addition to being used for cance, check request, manager call and parking lot attendant. Display G would merely have additional information requests exhibited in displays 15 through 20, display 11 through 14 exhibiting CANC, TOTL, MGR and PARK, respectively. The waiter would then depress the key associated with the information desired.

In the foregoing description of the two-way communications embodiment of remote unit 10, the functions of the various units of the central system have not been described in detail because these function with the two-way communication embodiment in the same manner that these units operate in conjunction with the transmit only embodiment and the function of these units is described in detail in the description of the operation of the transmit only embodiment. There is, however, one obvious difference. In the two-way communications embodiment, remote unit 10 and central processor 42 communicate back and forth with each other; whereas, in the transmit only embodiment, the communication is from remote unit to central processor, but not from central processor to remote unit except for the interrogation signal.

From the foregoing description of the invention, it should be obvious that this invention provides a versatile restaurant management and information control system. For restaurants having a relatively small number of items on the menu the transmit only embodiment of the remote unit provides a fully satisfactory system. For restaurants having a large and varied number of items, the two-way communications embodiment which is more versatile and provides greater flexibility would be the preferred embodiment in most instances. The two-way communications embodiment of the remote units is highly versatile in that it can provide a system capable of performing any number of functions being limited only by practical considerations such as cost and size of the computer in central processor 42 and the costs and complexity of operation of the remote units. If the system becomes too complex, operation of the remote units may well become too burdensome and technical for a waiter to operate. In any event, with either embodiment, a restaurant owner or manager has a tool that provides complete management and control information. At any given time the manager can obtain a complete inventory of items, the number of each item sold, the amount of each item still on hand. Further, he has at hand information on the total receipts and other information. With this wealth of readily available information, the manager can more effectively manage and control the business. In addition, the system can be expanded to provide additional restaurant functions and information other than the functions and information specifically described and the operation of the system can be varied by prerecording appropriate programs for central processor 42. For example, additional functions can be provided by adding additional keys to keyboard 22 of remote units 10. Also the manner in which the system operates can be varied by varying the manner in which the remote units transmit the information and the central processor processes the information. For example, as described above, the system can be so designed and programmed that the auxilliary key is always used as a signal ready key or central processor can be programmed to accept parts of an item ordered and assemble the parts to provide the total ingredients of an item or the system can be designed and programmed such that the auxiliary key is needed as a ready signal key only in those cases where a given item ordered for more than one component. In other words the system of this invention provides a high degree of flexibility so that the system can be tailored to meet the different needs of various different kinds of restaurants in business today. Therefore, while the invention has been described with reference to a specific embodiment of the central system and with reference to two specific embodiments of the remote units, it will be obvious to those skilled in the art that various changes and modifications can be made to the central system embodiment and to the two remote unit embodiments without departing from the spirit and scope of the invention as set forth in the claims.

What is claimed is:

1. A method for taking a patron's food/drink order in a restaurant by a waiter, comprising, providing said waiter with a keyboard and display means for manual entry by the waiter of said patron's food/drink order data, displaying to said waiter
     the patron's table number,
     seat number of the patron whose order is being taken, and
     food/drink order data,
     on said display means integrally associated with said keyboard means, cycling said display through a sequence of sub-menu displays integrally related to said keyboard means to sequentially and automatically guide the waiter through an order taking sequence of steps for taking the patron's food/drink order whereby each item of the patron's order is entered by one key entry actuation and the patron's food/drink order is transduced to a machine processable form, storing the table number and patron seat number of the person whose order is being taken and associated patron food/drink order data, in a short time memory means coupled to said keyboard means, and causing said short time memory means to deliver the information stored therein to a central station.

2. The method of taking a patron's order in a restaurant as defined in claim 1 wherein said keyboard means includes a series of vertically arrayed selection switches and a corresponding number and correspondingly arrayed displays associated with each selection switch and said step of cycling said display through a sequence of sub-menu displays includes branching from one sub-menu display to a next succeeding and related sub-menu display for each patron's order, respectively.

3. The invention defined in claim 1 including the further step of cycling said display through a change order sequence for changing a patron's food/drink order data, including the step of
     displaying to the waiter that patron's food/drink order data as originally entered by the waiter, and
     entering to said keyboard the change order information as desired by said patron,
     storing said change order information in said short time memory means and then
     causing said short time memory means to deliver the change order information to said central station.

4. The invention defined in claim 1 including automatically totaling the cost of each patron's charge for their respective food/drink order, and the further steps of cycling said display through a billing sequence for all patron's occupying a given table number, including
     displaying to the waiter a list of choices available for payment,
     entering via said keyboard the selected choice for payment and
     producing an itemized check for that table number.

5. The invention defined in claim 4 wherein the displayed choices include
   the identity of available credit card cards, entry on said keyboard of the credit card chosen, and
   the credit card number, and then
   preparing the check with said credit card number printed thereon.

* * * * *